United States Patent [19]

Gamble et al.

[11] 3,921,068

[45] Nov. 18, 1975

[54] INDICATING POTENTIOMETER

[75] Inventors: John G. Gamble, Simsbury; Allan R. Ames, Weatogue, both of Conn.

[73] Assignee: Veeder Industries, Inc., Hartford, Conn.

[22] Filed: June 10, 1974

[21] Appl. No.: 477,701

[52] U.S. Cl. .............................. 324/98; 323/94 R
[51] Int. Cl.² .................... G01R 17/00; H02P 9/00
[58] Field of Search ................ 324/98, 99 R, 99 D; 323/94 R

[56] References Cited
UNITED STATES PATENTS 3,725,782   4/1973   Naive et al. ........................ 324/98

Primary Examiner—Alfred E. Smith
Assistant Examiner—Ernest F. Karlsen
Attorney, Agent, or Firm—Prutzman, Hayes, Kalb & Chilton

[57] ABSTRACT

An indicating potentiometer with a potentiometer having an input rotor rotatable through ten revolutions between internal limit stops of the potentiometer for setting the potentiometer output voltage, a rotary counter geared to the potentiometer rotor for displaying a readout of the potentiometer setting through an available counter readout range corresponding to the potentiometer voltage range, a manually settable drive shaft for simultaneously setting the rotor and counter and a pair of auxiliary resistors connected in series with the potentiometer for establishing an available potentiometer voltage range in accordance with the applied voltage and/or the desired counter readout range.

8 Claims, 4 Drawing Figures

INDICATING POTENTIOMETER

BRIEF SUMMARY OF THE INVENTION

The present invention relates to indicating potentiometers of the type comprising a potentiometer with a bidirectional rotor operable between limit stops for setting the potentiometer voltage and a bidirectional indicating counter connected to the potentiometer rotor for indicating, for example, the potentiometer voltage setting or some related value established by the potentiometer voltage setting.

It is a principal aim of the present invention to provide a new and improved indicating potentiometer of the type described wherein the available potentiometer voltage range corresponds to the desired voltage range of the potentiometer application and such that the available rotor limit stops preclude establishing a potentiometer voltage setting above or below the desired voltage range and wherein the indicating counter provides an accurate indication of the potentiometer setting throughout the available voltage range.

It is another aim of the present invention to provide a new and improved indicating potentiometer of the type described having an economical and reliable construction permitting the indicating potentiometer to be easily customized for providing an accurate indication of the potentiometer voltage setting throughout the desired voltage range.

It is a further aim of the present invention to provide a new and improved indicating potentiometer which is pre-settable for establishing the desired potentiometer voltage range and the desired counter readout range for establishing the potentiometer voltage range.

It is another aim of the present invention to provide a new and improved indicating potentiometer of the type described which can be manufactured in a standard mechanical design for numerous applications having different desired potentiometer voltage ranges and which permits the indicating potentiometer to be readily customized for each application.

It is a further aim of the present invention to provide a new and improved indicating potentiometer of the type described wherein the readout range can be established for the potentiometer range independently of the indicating potentiometer application.

Other objects will be in part obvious and in part pointed out in more detail hereinafter.

A better understanding of the invention will be obtained from the following detailed description and the accompanying drawings of illustrative applications of the invention.

DESCRIPTION OF THE PREFERRED EMBODIMENT

Figure 2:
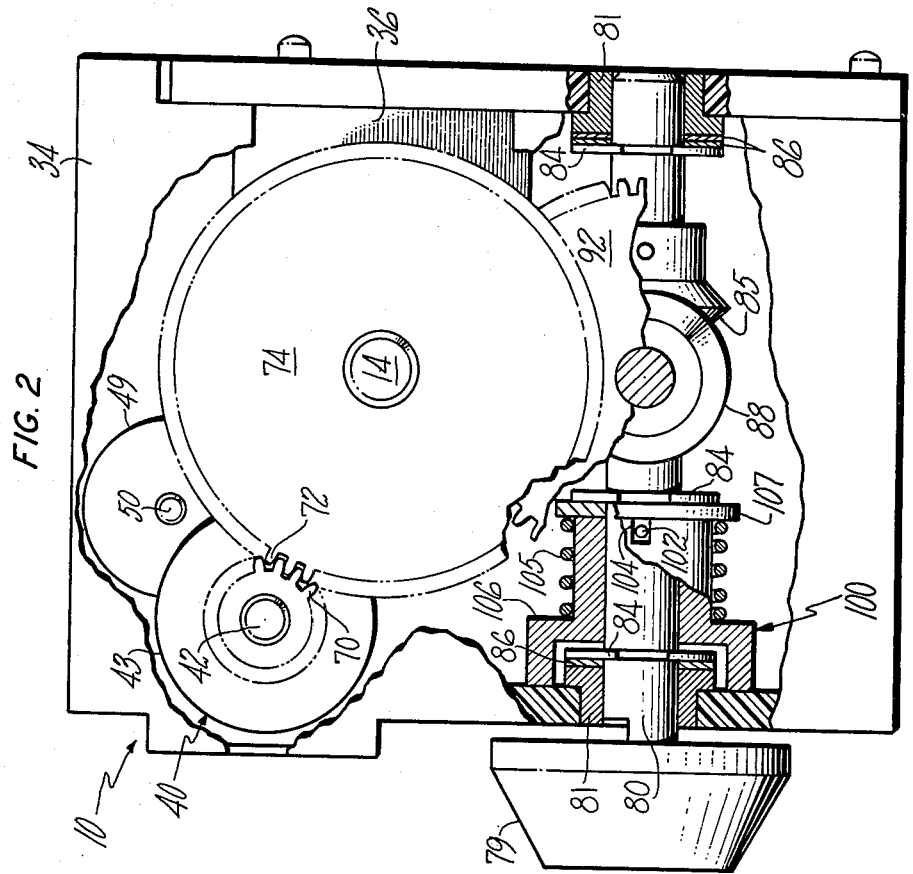
FIG. 2 is a side section view, partly broken away and partly in section, of the indicating potentiometer.
Figure 1:
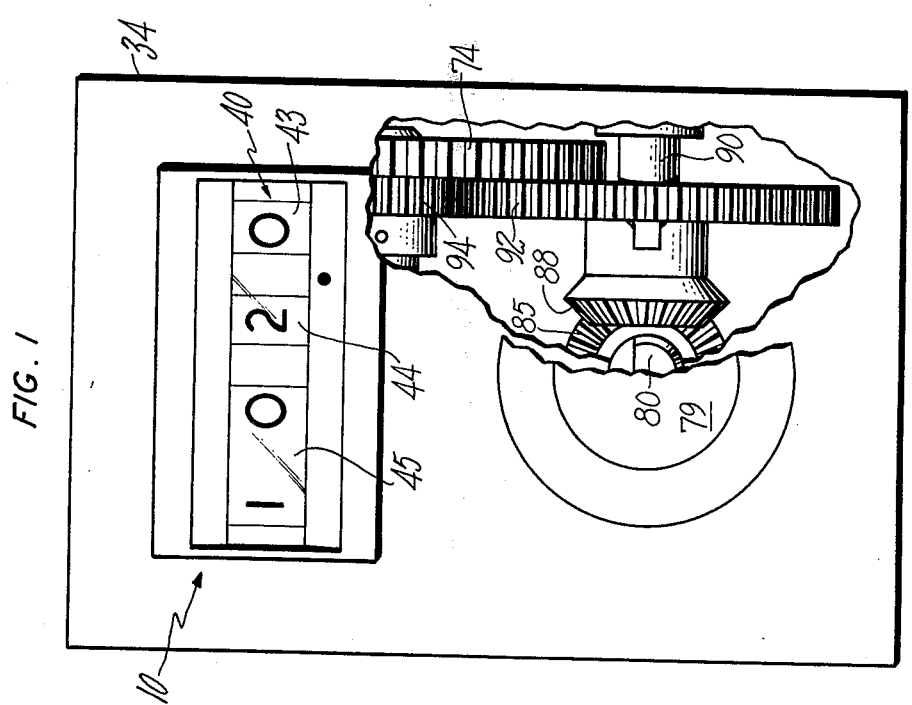
FIG. 1 is a front view of an indicating potentiometer, partly broken away, incorporating an embodiment of the present invention.
Figure 3:
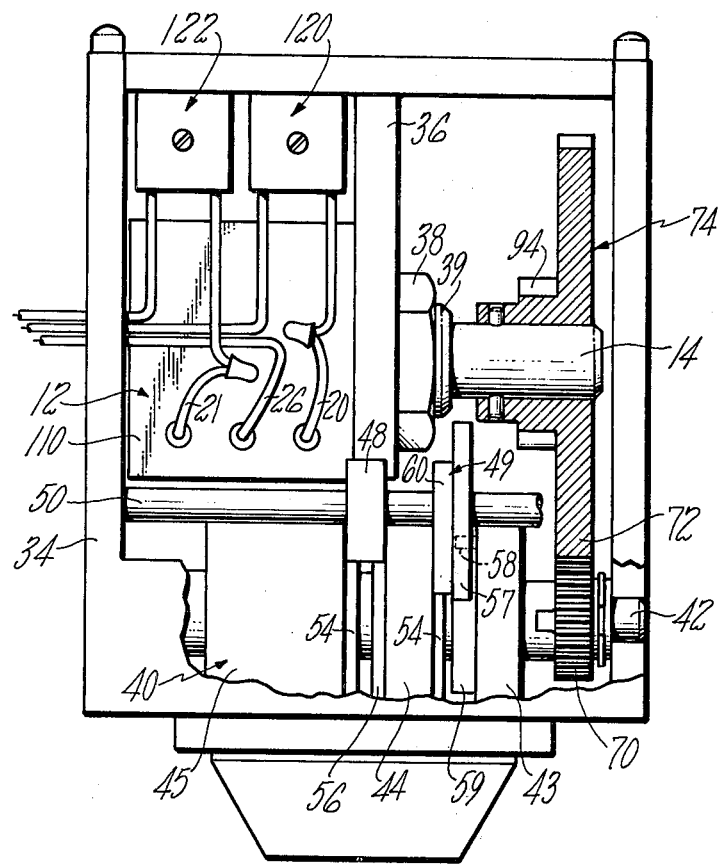
FIG. 3 is a top view, partly broken away and partly in section, of the indicating potentiometer.

Referring now to the drawings in detail wherein like numerals represent like parts, an indication potentiometer 10 incorporating an embodiment of the present invention comprises a conventional bidirectional potentiometer 12 of the type having a control rotor or shaft 14 adapted to be rotated ten revolutions (i.e. 10 × 360°) between internal limit stops 16, 17 (FIG. 4) of the potentiometer for substantially infinitely varying the potentiometer setting through its available range.

Figure 4:
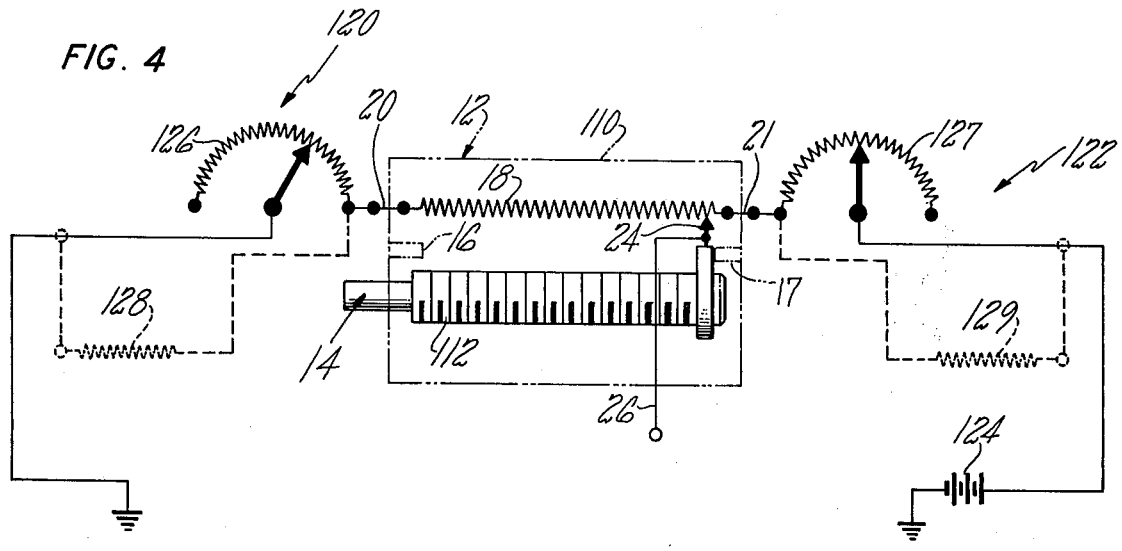
FIG. 4 is a schematic of the electrical circuit of the indicating potentiometer, showing a modification thereof in broken lines.

As best seen in FIG. 4, the potentiometer 12 comprises a suitable resistor 18 having a pair of electrical leads 20, 21 at its opposite ends, and a tap 24 having an electrical lead 26 and settable along the full length of the resistor 18 by rotation of the potentiometer rotor 14 between the internal limit stops 16, 17. As is well known, the potentiometer voltage setting (i.e. the tap voltage) is a function of the voltage applied to the potentiometer and the setting of the tap 24. Thus, for example, where the electrical conductor leads 20, 21 are connected directly to a 30 volt power supply, the potentiometer voltage at the tap 24 can be varied between 0 volts (at the minimum setting of the tap 24 where the tap 24 engages its lower limit stop 16) and 30 volts (at the maximum setting of the tap 24 where the tap 24 engages the upper limit stop 17). Thus, in the conventional installation where the potentiometer is employed for establishing a tap voltage within a voltage range less than the available voltage range of the potentiometer, the full range of adjustment of the tap 24 and rotor 14 is not used, in which event suitable additional limit stops are often provided for limiting shaft rotation for preventing setting the potentiometer voltage above or below the desired voltage range.

The potentiometer 12 is mounted in a suitable box-like frame 34 having a center web 36 to which the potentiometer 12 is secured by a nut 38 mounted on a threaded collar 39 of the potentiometer.

A bidirectional counter 40 having a counter shaft 42 press fit within aligned openings in the frame 34 parallel to the potentiometer rotor 14 is provided for indicating the setting of the potentiometer, for example, for indicating the actual potentiometer tap voltage, or for indicating a value established by the potentiometer tap voltage, or for providing a percentage indication of the potentiometer tap voltage within the available range.

The counter shown comprises three counter wheels 43–45 of ascending order of significance rotatably mounted on the counter shaft 42 and two intermediate transfer elements 48, 49 rotatably mounted on a transfer pinion shaft 50, also press fit within aligned apertures in the frame 34. In the shown embodiment, the two lowest order counter wheels 43, 44 bear a 0–9 sequence of numerals equiangularly spaced around their perimeter in a conventional manner, and the highest order counter wheel 45 bears a 1–10 sequence of numerals equiangularly spaced about its perimeter and such that the counter 40 provides a readout from 100 to 1099. The transfer element 48 is a mutilated pinion of generally conventional construction and co-acts with a wheel drive gear 54 formed integrally with the adjacent higher order counter wheel 45 and a combination locking ring and transfer gear segment 56 formed integrally with the adjacent lower order counter wheel 44 for indexing the adjacent higher order counter wheel 45 one count (or 36°) for each revolution of the adjacent lower order counter wheel 44 and as the lower order counter wheel 44 is rotated in the increasing count direction from 9 to 0 or in the decreasing count direction from 0 to 9. The transfer element 49 comprises a suitable Geneva segment 57 which co-acts with a pin 58 and locking hub 59 formed integrally with the lowest order counter wheel 43 and a gear segment 60 which meshes with a wheel drive gear 54 formed integrally with the adjacent higher order counter wheel 44 for indexing the adjacent higher order counter wheel 44 one count or 36° for each revolution of the lowest order counter 43 and as the wheel 43 is rotated from in the increasing count direction from 9 to 0 or in the opposite direction from 0 to 9.

The Geneva segment 57 is provided for smoothly accelerating and decelerating the transfer drive and for thereby avoiding any shock reaction during transfer which would affect the accuracy of the counter readout or the position of the potentiometer setting, the counter and potentiometer being connected for simultaneous operation as hereinafter described.

A counter drive gear 70 rotatably mounted on the counter shaft 42 and keyed to the lowest order counter wheel 43 meshes with a gear 72 of a compound gear 74 fixed onto the potentiometer shaft 14. Thus, the bidirectional counter and bidirectional potentiometer rotor are positively connected together by a single pass of gears 70, 72 to rotate together with minimum backlash or therebetween. In the shown embodiment, the gears 70, 72 have 20 and 81 teeth respectively whereby the counter is indexed through a readout range of 405 counts as the potentiometer rotor 14 is rotated ten revolutions between the internal end stops 16, 17. In the shown embodiment, the counter 40 is adapted to be indexed between a low readout of 61.5 and a high readout of 102.0 as the rotor 14 is rotated between its limit stops. Of course, any readout range can be readily established by selecting the desired low readout and the desired gear ratio between the counter and potentiometer rotor.

A control shaft 80 having a flattened outer end for receiving a suitable knob 79 is rotatably mounted within suitable bushings 81 mounted within aligned openings in the frame 34. Retaining rings 84 are mounted within annulusses in the control shaft 80 and suitable washers 86 are mounted on the shaft 80 between two of the retaining rings 84 and the bushings 81 to retain the drive shaft in proper axial position where a bevel gear 85 fixed onto the shaft 80 has good intermeshing engagement with a bevel gear 88 rotatably mounted on an intermediate stub shaft 90 mounted on the frame 34. Also, a relatively large gear 92 is keyed to the bevel gear 88 for engagement with a relatively small gear 94 of the potentiometer shaft compound gear 74. Thus, the control shaft 80 can be manually rotated to rotate the potentiometer rotor 14 to set the potentiometer and simultaneously rotate the counter 40 to register the potentiometer setting.

A bidirectional friction brake collar 100 is keyed to the setting shaft 80 through the co-action of a transverse pin 102 on the shaft 80 with an axially extending slot 104 in the brake collar 100. The brake collar is axially shiftable relative to the shaft 80 and is biased into engagement with an inner face, the frame 34 coil spring 105 compressed between an enlarged friction section 106 of the brake collar and a separate washer 107 which engages the intermediate retaining ring 84. Thus, the collar 100 provides a friction shoe for braking the rotation of the setting shaft 80 and for thereby assisting in preventing excessively rapid adjustment of the potentiometer and counter and shock engagement of the internal limit stops 16, 17 of the potentiometer.

The potentiometer 12 employs a suitable housing 110 for enclosing the potentiometer resistor 18, potentiometer tap 24, a rotor adjustment screw 112 and the internal limit stops 16, 17, and for thereby protecting those parts against foreign matter. The three potentiometer conductor leads 20, 21, 26 extend through suitable openings in the potentiometer housing 110 and therefore provide for electrical connection to the internal circuit of the potentiometer. The tap electrical conductor lead 26 provides for transmitting the tap voltage as a control voltage to the external circuit (not shown) with which the indicating potentiometer 10 is employed and which determines the requires potentiometer voltage range. The required voltage range can, for example, be nominally 10, 20 or 30 volts, etc. with a nominal minimum voltage of 0, 5 or 10 volts, etc. Alternatively, relatively specific maximum and minimum voltage levels such as 3.2 and 8.6 volts could be required to meet the control requirements of the external circuitry with which the indicating potentiometer 10 is associated.

In accordance with an aspect of the present invention, auxiliary resistance means 120, 122 are connected to the potentiometer leads 20, 21 in series with the potentiometer resistor 18 to provide a resultant series circuit for electrical connection to the available electrical power supply (shown as a battery 124 in FIG. 4). The auxiliary resistance means 120, 122 may comprise variable resistors 126, 127 which can be independently manually set to establish appropriate resistance values (as hereinafter described) at each end of the potentiometer resistor 18. Alternatively, fixed resistors 128, 129 (shown in broken lines in FIG. 4 and having appropriate resistance values as hereinafter described) may be used in place of the variable resistors 126, 127.

The resistance values of the auxiliary resistance means 120, 122 (designated $R_A$ and $R_B$ hereinafter) are established in accordance with the voltage (designated $V_S$ hereinafter) of the electrical power supply to which the indicating potentiometer 10 is connected; the resistance value of the potentiometer resistor 18 (designated $R_p$ hereinafter); and the maximum and minimum control voltages of the required voltage range (designated $V_1$ and $V_2$ hereinafter); in accordance with the following formulae:

$$R_A = \frac{V_1(R_P)}{(V_2 - V_1)} \text{ and } R_B = \frac{(V_S - V_2)(R_P)}{(V_2 - V_1)}$$

Using the foregoing formulae to establish the resistance values of the resistance means 120, 122, the potentiometer control voltage range will exactly correspond to the required voltage range. As a consequence, the potentiometer cannot be manually operated to establish a control voltage above or below the required voltage range. Also, the internal limit stops 16, 17 of the potentiometer provide suitable limit stops for the entire indicating potentiometer 10 and additional stops are not required. Further, the counter readout range which is provided for the full potentiometer setting range remains accurate throughout the entire control voltage range; or viewing the matter differently, the control voltage range of the potentiometer 12 is established with the auxiliary resistance means 120, 122 to make the counter readout calibration accurate.

As will be apparent to persons skilled in the art, various modifications, adaptations and variations of the foregoing specific disclosure can be made without departing from the teachings of the present invention.

We claim:

1. An indicating potentiometer comprising a bidirectional potentiometer having a housing, electrical resistance means within the housing, a pair of separate electrical conductor leads connected to opposite ends of the electrical resistance means, a single bidirectional potentiometer tap within the housing, an electrical conductor lead connected to the potentiometer tap, the potentiometer tap being adjustable along the electrical resistance means for establishing a potentiometer control voltage, a single bidirectional rotor operatively connected to the potentiometer tap and adjustable in each angular direction between high and low limit positions thereof, establishing the potentiometer range, for adjusting the potentiometer tap along the electrical resistance means, and potentiometer stop means, mounted within the potentiometer housing, establishing the high and low limit positions of the rotor and therefore the potentiometer range; a bidirectional multiple wheel rotary readout counter comprising a plurality of coaxial bidirectional rotary counter wheels of ascending order and transfer means between adjacent order counter wheels for bidirectionally transferring counts from each adjacent lower order counter wheel to the adjacent higher order counter wheel and counter drive means operatively connecting the lowest order rotary counter wheel of the multiple wheel rotary readout counter to the potentiometer rotor for rotation of the lowest order counter wheel in opposite angular directions therewith for presenting a predetermined multiple wheel visual readout of the potentiometer tap setting through a readout range corresponding to the potentiometer range, and a pair of auxiliary resistance means respectively connected to said pair of separate electrical conductor leads in series with the potentiometer resistance means to provide a resultant series circuit adapted to be connected across an electrical supply voltage for establishing a predetermined control voltage range corresponding to the predetermined readout range of the counter.

2. An indicating potentiometer according to claim 1 wherein at least one of the pair of auxiliary resistance means is a manually settable variable resistor for manually establishing its resistance in said resultant series circuit.

3. An indicating potentiometer according to claim 2 wherein both of said pair of auxiliary resistance means are manually settable variable resistors for manually establishing their respective resistances in said resultant series circuit.

4. An indicating potentiometer according to claim 1 wherein both of said pair of auxiliary resistance means have fixed predetermined resistances in said resultant series circuit.

5. An indicating potentiometer according to claim 1 wherein the counter drive means comprises a single gear pass with a first relatively large drive gear on the potentiometer rotor and a second relatively small gear coaxial with the rotary counter and connected directly thereto.

6. An indicating potentiometer according to claim 1 further comprising a bidirectional manually rotatable setting shaft, and gear means operatively connecting the setting shaft to the potentiometer rotor for manually setting the potentiometer and counter.

7. An indicating potentiometer according to claim 6 further comprising bidirectional friction brake means for frictionally retarding the setting shaft rotation in both angular directions.

8. An indicating potentiometer comprising a bidirectional potentiometer having electrical resistance means, having $R_p$ ohms resistance, with a pair of electrical conductor leads at opposite ends thereof, a single bidirectional potentiometer tap having an electrical conductor lead, the potentiometer tap being adjustable along the electrical resistance means for establishing a potentiometer control voltage, a single bidirectional rotor operatively connected to the potentiometer tap and adjustable between high and low limit positions thereof, establishing the potentiometer range, for adjusting the potentiometer tap along the electrical resistance means, and potentiometer stop means establishing the high and low limit positions of the rotor and therefore the potentiometer range; a bidirectional multiple wheel rotary readout counter comprising a plurality of coaxial bidirectional rotary counter wheels of ascending order and transfer means between adjacent order counter wheels for bidirectionally transferring counts from each adjacent lower order counter wheel to the adjacent higher order counter wheel, the lowest order counter wheel of the multiple wheel rotary readout counter being positively connected to the potentiometer rotor for rotation of the lowest order counter wheel in opposite angular directions therewith for displaying a predetermined multiple wheel visual readout of the potentiometer tap setting through a readout range corresponding to the potentiometer range, and a pair of auxiliary resistance means, respectively having $R_A$ and $R_B$ ohms resistance, connected to said pair of electrical conductor leads respectively in series with the potentiometer resistance means to provide a resultant series circuit adapted to be connected across an electrical supply voltage, having $V_S$ volts, for establishing a predetermined control voltage range, having a minimum voltage of $V_1$ volts and a maximum voltage of $V_2$ volts, and wherein $$R_A = \frac{V_1(R_P)}{(V_2 - V_1)} \text{ and } R_B = \frac{(V_S - V_2)(R_P)}{(V_2 - V_1)}.$$

* * * * *